(12) United States Patent  
Park et al.

(10) Patent No.: US 9,131,514 B2  
(45) Date of Patent: Sep. 8, 2015

(54) METHOD OF ALLOCATING RADIO RESOURCES AND APPARATUS OF ALLOCATING RADIO RESOURCES IN COGNITIVE RADIO SMALL-CELL NETWORKS

(71) Applicant: Electronics and Telecommunications Research Institute, Daejeon (KR)

(72) Inventors: Jae Cheol Park, Daejeon (KR); Kyu Min Kang, Daejeon (KR); Sang In Cho, Daejeon (KR); Dong Hun Lee, Daejeon (KR); Byung Jang Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/268,582

(22) Filed: May 2, 2014

(65) Prior Publication Data

US 2015/0208422 A1    Jul. 23, 2015

(30) Foreign Application Priority Data

Jan. 20, 2014    (KR) ........................ 10-2014-0006773

(51) Int. Cl.
| | |
|---|---|
| *H04W 72/00* | (2009.01) |
| *H04B 7/00* | (2006.01) |
| *H04W 72/08* | (2009.01) |
| *H04W 52/34* | (2009.01) |
| *H04W 52/24* | (2009.01) |

(52) U.S. Cl.  
CPC .......... *H04W 72/082* (2013.01); *H04W 52/243* (2013.01); *H04W 52/346* (2013.01)

(58) Field of Classification Search  
CPC combination set(s) only.  
See application file for complete search history.

(56) References Cited

U.S. PATENT DOCUMENTS

| | | | | |
|---|---|---|---|---|
| 2011/0143806 | A1* | 6/2011 | Song et al. | ..................... 455/522 |
| 2012/0064935 | A1* | 3/2012 | Hakola et al. | ................. 455/513 |

FOREIGN PATENT DOCUMENTS

| | | |
|---|---|---|
| KR | 1020100053725 A | 5/2010 |
| KR | 1020100063885 A | 6/2010 |

\* cited by examiner

*Primary Examiner* — Chuong A Ngo  
*Assistant Examiner* — Frantz Bataille  
(74) *Attorney, Agent, or Firm* — William Park & Associates Ltd.

(57) ABSTRACT

Disclosed is a method of allocating radio resources, including: acquiring available channel information of a cognitive radio small cell; analyzing a channel characteristic based on the available channel information and dividing a required transmission rate of the cognitive radio small cell into required transmission rates for each available channel; and performing a power control for each available channel based on the divided required transmission rates for each available channel. The method of allocating radio resources may be performed under an interference environment in which a plurality of cognitive radio small cells is present and the plurality of cognitive radio small cells shares an available channel.

14 Claims, 6 Drawing Sheets

METHOD OF ALLOCATING RADIO RESOURCES AND APPARATUS OF ALLOCATING RADIO RESOURCES IN COGNITIVE RADIO SMALL-CELL NETWORKS

CROSS-REFERENCE TO RELATED APPLICATIONS

This application claims priority to and the benefit of Korean Patent Application No. 10-2014-0006773 filed in the Korean Intellectual Property Office on Jan. 20, 2014, the entire contents of which are incorporated herein by reference.

BACKGROUND

1. Technical Field

Various embodiments of the present invention relates to a method of allocating radio resources and an apparatus of allocating radio resources, and more particularly, to a method of allocating radio resources and an apparatus of allocating radio resources that divide a required transmission rate of a small cell for each available channel in a cognitive radio small-cell environment.

2. Related Art

With the development of next-generation mobile communication and widespread of a new wireless communication apparatus, various application services can be used by accessing a radio service anytime and anywhere. As a result, in recent years, wireless Internet traffic has been explosively increased.

In order to increase a network capacity with limited resources, a small-cell based mobile communication technology has been actively developed. Also, a cognitive radio communication technology suggesting a new paradigm of frequency allocation in order to improve efficiency of frequency draws keen attention. A research into creating a new technology has been actively made by merging two technologies in order to develop a wireless communication service that stably provides enormous radio traffic in the future.

When an additional sharable band is secured and operated as multiple bands by applying a cognitive radio function in a small cell, a small cell network capacity may be increased by increasing an available bandwidth. However, a characteristic of a frequency band is diversified in using the sharable band, and a protection criterion of a protection service for each channel is completely different. As a result, the necessity of resource allocation for each band is increased.

In particular, since the sharable band is changed depending on the position of the small cell or a terminal, in general, a channel is partially shared, and in this case, multi-band resource allocation needs to be performed.

SUMMARY

In an embodiment of the present disclosure has been made in an effort to provide a method of allocating radio resources and an apparatus of allocating radio resources that divide a required transmission rate for each channel with respect to cognitive radio small cells that share channels, and thereafter, perform a power control according to the divided required transmission rate, thereby remarkably reducing complexity for resource allocation.

In an embodiment of the present disclosure has been made in an effort to provide an apparatus of allocating radio resources, which acquires channel information, calculates a channel characteristic, and controls channel power in different layers.

Technical objects of the present disclosure are not limited to the aforementioned technical objects and other technical objects which are not mentioned will be apparently appreciated by those skilled in the art from the following description.

An embodiment of the present disclosure provides a method of allocating radio resources, including: acquiring available channel information of a cognitive radio small cell; analyzing a channel characteristic based on the available channel information and dividing a required transmission rate of the cognitive radio small cell into required transmission rates for each available channel; and performing a power control for each available channel based on the divided required transmission rates for each available channel.

The dividing of the required transmission rate of the cognitive radio small cell into the required transmission rates for each available channel may include: calculating a characteristic coefficient based on the available channel information; and calculating the required transmission rates for each available channel based on the characteristic coefficient and the required transmission rate of the cognitive radio small cell.

The available channel information may include at least one of a protection service type of an available channel, a data transmission rate, the number of available channels, interference intensity, a signal to interference plus noise ratio (SINR), and a signal to leakage plus noise ratio (SLNR).

The characteristic coefficient $\alpha_k^{(s)}$ for an available channel s of a cognitive radio small cell k may be calculated by $$\alpha_k^{(s)} = \frac{w_s r_k^{(s)}}{\sum_{s \in S_k} w_s r_k^{(s)}}, s \in S_k,$$

and $w_s$ may correspond to a weight value set and calculated based on the available channel information.

The performing of the power control for each available channel may include determining transmission power for each available channel, and the transmission power $p_k^{(s)}$ for each available channel for the available channel s of the cognitive radio small cell k may be calculated by a minimum value to satisfy the required transmission rate for each channel through an equation described below, $$\min_{p_k^{(s)}} \sum_{k=1}^{K} p_k^{(s)}$$
$$\text{s.t. } r_k^{(s)} \geq r_k^{(s),t},$$

and $r_k^{(s)}$ may correspond to a transmission rate of the available channel s of the cognitive radio small cell k, and $r_k^{(s),\,t}$ may correspond to the required transmission rate for each available channel of the available channel s of the cognitive radio small cell k.

The calculating of the required transmission rate for each available channel and the performing of the power control may be implemented in a cross-layer manner.

The method of allocating radio resources may be performed under an interference environment in which a plurality of cognitive radio small cells sharing an available channel exist.

Another embodiment of the present disclosure provides an apparatus of allocating radio resources under an interference environment in which a plurality of cognitive radio small cells partially shares the available channel, the apparatus including: a channel information acquiring unit configured to acquire available channel information of a cognitive radio small cell; a channel characteristic analyzing unit configured to analyze a channel characteristic based on the available channel information; a channel required transmission rate determining unit configured to divide a required transmission rate of a cognitive radio small cell into required transmission rates for each available channel based on the analyzed channel characteristic; and a channel transmission power control unit configured to perform a power control for each available channel based on the divided required transmission rates for each available channel.

The channel information acquiring unit may operate in a first layer, and the channel characteristic analyzing unit may operate in a second layer different from the first layer.

The apparatus may further include a transmission unit configured to transmit a signal having transmission power corresponding to the controlled power and operate in the first layer.

The channel characteristic analyzing unit may analyze the channel characteristic by using two or more of the available channel information.

The channel transmission power control unit may determine transmission power for each available channel based on the required transmission rate for each available channel, an adaptive coding and demodulation mode for each channel, and system quality of service (QoS).

The channel transmission power control unit may allocate transmission power of $p_k^{(s)}$ calculated as below with respect to an available channel s of a cognitive radio small cell k $$\min_{p_k^{(s)}} \sum_{k=1}^{K} p_k^{(s)}$$

$$\text{s.t. } r_k^{(s)} \geq r_k^{(s),t},$$

and $r_k^{(s)}$ may correspond to a transmission rate of the available channel s of the cognitive radio small cell k and $r_k^{(s),t}$ may correspond to the required transmission rate for each available channel of the available channel s of the cognitive radio small cell k.

The channel characteristic analyzing unit may calculate a characteristic coefficient based on the available channel information and multiply the calculated characteristic coefficient by the required transmission rate of the cognitive radio small cell to calculate the required transmission rate for each available channel.

The characteristic coefficient $\alpha_k^{(s)}$ for the available channel s of the cognitive radio small cell k may be calculated by $$\alpha_k^{(s)} = \frac{w_s r_k^{(s)}}{\sum_{s \in S_k} w_s r_k^{(s)}}, s \in S_k,$$

and $w_s$ may correspond to a weight value set and calculated based on the available channel information.

According to the embodiments of the present disclosure, a method of allocating radio resources and an apparatus of allocating radio resources divide a required transmission rate into required transmission rates for each available channel by reflecting characteristics (a protection service, a transmission rate, interference intensity, an SINR, an SLNR, the number of sharing apparatuses for each channel, the number of available channels, and the like) of an available channel, thereby independently performing a multiband power control for each channel. In the specification, performing the power control is determining transmission power and may be understood as a concept corresponding to resource allocation.

Accordingly, the existing multiband radio resource allocation is performed simultaneously for both all channels and users to show complexity in which exponentially increases with respect to a multiplication of the number of channels and the number of users, but the method of allocating radio resources and the apparatus of allocating radio resources according to the exemplary embodiments of the present invention perform the resource allocation for each channel to exponentially increase with respect to only the number of users, thereby decreasing the complexity.

The method of allocating radio resources and the apparatus of allocating radio resources according to the embodiments of the present disclosure can perform the resource allocation in parallel for each channel to shorten an optimization time as compared with the resource allocation in the related art, thereby adapting to a radio environment which is rapidly changed.

The exemplary embodiment of the present invention is illustrative only, and various modifications, changes, substitutions, and additions may be made without departing from the technical spirit and range of the appended claims by those skilled in the art, and it will be appreciated that the modifications and changes are included in the appended claims.

DETAILED DESCRIPTION

Figure 1:
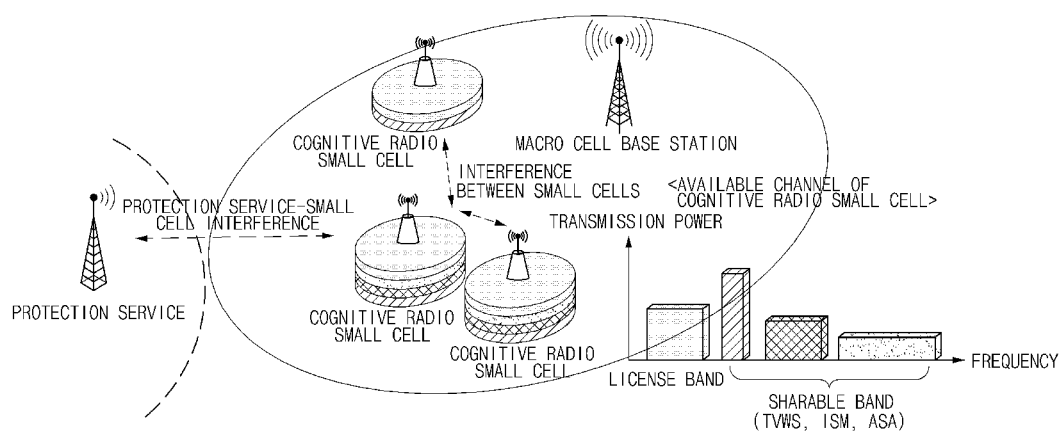
FIG. 1 is a diagram illustrating a cognitive radio small cell network environment.

Hereinafter, exemplary embodiments of the present invention will be described in detail with reference to the accompanying drawings. Like reference numerals refer to like constituent elements and a duplicated description of like constituent elements will be omitted.

Specific structural or functional descriptions of exemplary embodiments of the present invention disclosed in the specification are made only for purposes of describing the exemplary embodiments of the present invention, and the exemplary embodiments of the present invention may be carried out in various forms, and it should not be construed that the present invention is limited to the exemplary embodiments described in the specification.

In describing constituent elements of the exemplary embodiment of the present invention, terms such as first, second, A, B, (a), and (b) may be used. The terms are only used to distinguish a constituent element from another constituent element, but a nature or an order of the constituent element is not limited by the terms.

The present invention provides a multiband resource allocating method for using a sharable band acquired by accessing database or sensing a spectrum with energy efficiency in a cognitive radio small cell. Further, the present invention provides an apparatus of allocating radio resources, which designs the method of allocating radio resources in a cross-layer manner.

In detail, the present invention provides a multiband resource allocating technique for improving energy efficiency under an environment in which cognitive radio small cells or cognitive radio apparatuses using multiple channels have different available channels to partially share the channels when the cognitive radio small cell operates the multiple bands by receiving available channel information. In this case, the present invention provides a technique that divides a required transmission rate into required transmission rates for each available channel by reflecting characteristics (a protection service, interference intensity, an SINR, an SLNR, the number of sharing apparatuses, the number of available channels, and the like) of an available channel of the cognitive radio small cell, and independently perform a power control for each channel. Hereinafter, an operation performed by a base station that controls the cognitive radio small cell will be primarily described. However, depending on exemplary embodiments, the same operation may be performed even in the cognitive radio apparatus that receives available channel information from the base station of the cognitive radio small cell.

FIG. 1 is a diagram illustrating a cognitive radio small cell network environment.

Referring to FIG. 1, a cognitive radio small cell according to the present disclosure uses both an existing license band and a sharable band by securing a sharable band with a cognitive radio function (accessing database or sensing a spectrum), so as to operate multiple bands. For example, the sharable band may include a TV White Space (TVWS), an ISM band, and an additional sharable band.

Figure 2:
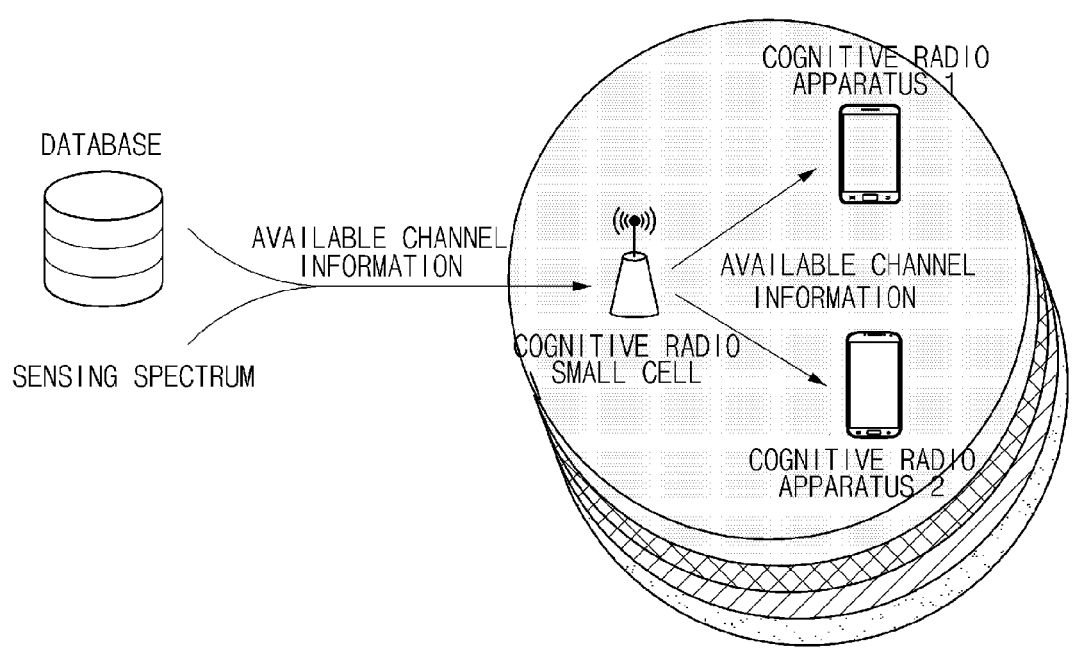
FIG. 2 is a diagram illustrating a cognitive radio small cell and a cognitive radio apparatus that acquire available channel information.

FIG. 2 is a diagram illustrating a cognitive radio small cell and a cognitive radio apparatus that receive available channel information.

The cognitive radio small cell may receive available channel information by accessing database or sensing a spectrum, and the cognitive radio apparatus may acquire available channel information by accessing the cognitive radio small cell.

Figure 3:
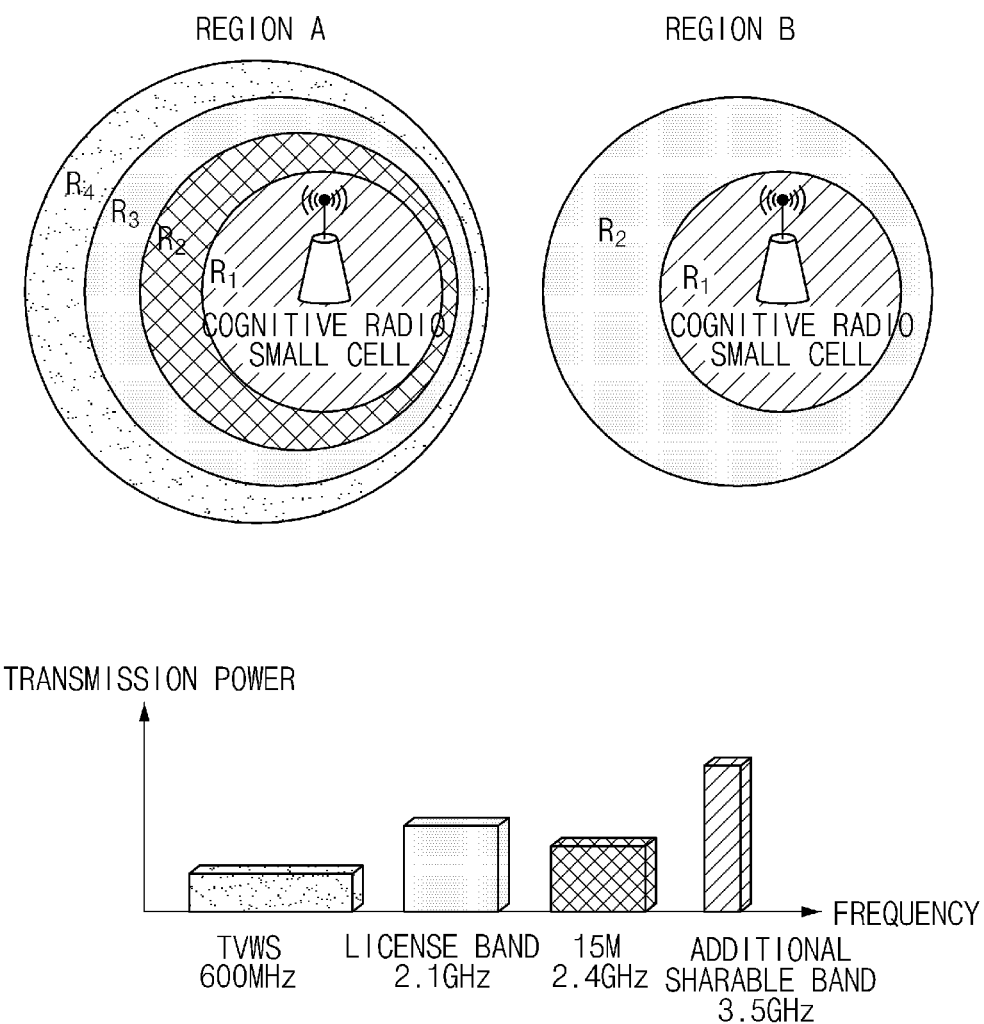
FIG. 3 is a diagram illustrating that an available channel is different for each specific area in the cognitive radio small cell.

FIG. 3 is a diagram illustrating that an available channel is different for each specific area in the cognitive radio small cell.

Referring to FIG. 3, an available channel in the cognitive radio small cell may be changed for each area in the small cell according to propagation characteristics of a frequency band.

Different available channels may be provided in regions of the cognitive radio small cell. Referring to FIG. 3, in region A, an additional sharable band channel may be used in area R1, and an ISM channel may be additionally in area R2 A license band channel may be used in area R3, and a TVWS channel may be used in area R4.

Region B has a different available channel from that of region A. Even in region B, different channels may be used in area R1 and area R2.

As described above, the cognitive radio small cell and the cognitive radio apparatus may have different available channels depending on the positions thereof.

Figure 4:
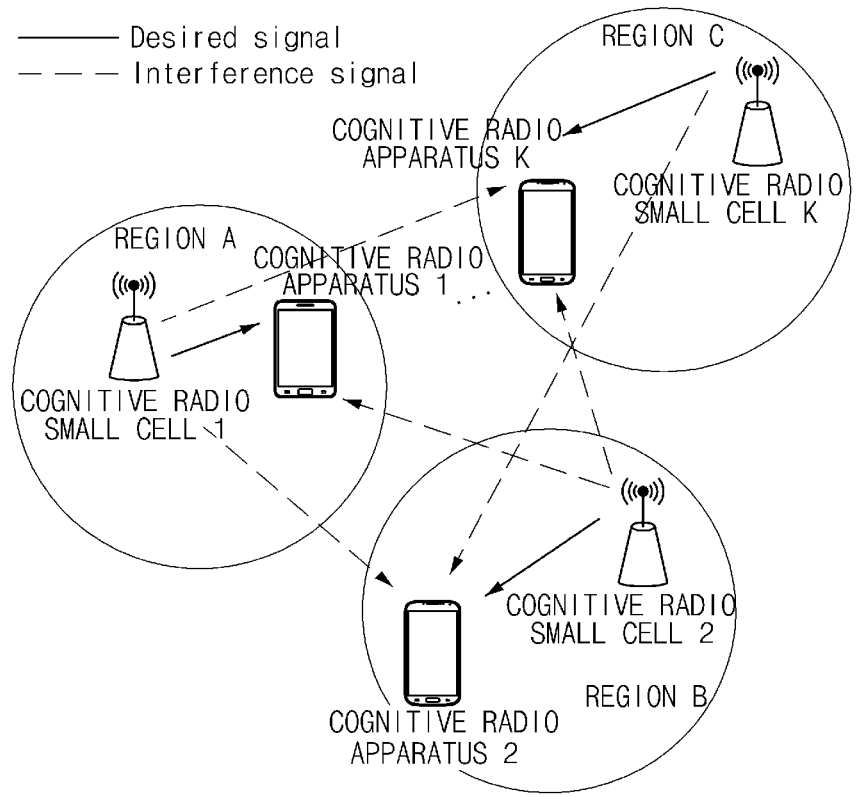
FIG. 4 is a diagram for describing a case in which different available channels are provided depending on the position of the cognitive radio apparatus.
Figure 4:
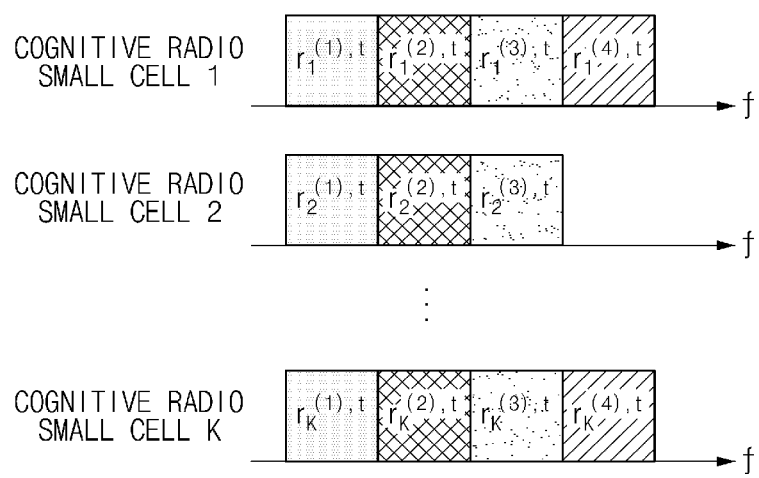

FIG. 4 is a diagram for describing a case in which different available channels are provided depending on the position of the cognitive radio apparatus. Hereinafter, a case in which the cognitive radio small cell has S available channels and K cognitive radio apparatuses are present will be described as an example.

Referring to FIG. 4, a plurality of cognitive radio apparatuses that are present at different positions has different available channels. A cognitive radio apparatus k is allocated an available channel set of $s \in S_k$, and $S_k \subset S$ according to the position, and data is transmitted/received through the allocated available channel set.

Transmission power of each available channel is represented by $p_k^{(s)}$, and a required data transmission rate of the cognitive radio apparatus is represented by $r_k^t$. The present invention may perform a multiband power control for improving energy efficiency of the cognitive radio apparatus under such an environment.

Referring to FIG. 4, a first cognitive radio apparatus positioned in a first cognitive radio small cell may use first to fourth channels. In a method of allocating radio resources according to an embodiment of the present disclosure, a required data transmission rate for each of the first to fourth channels is divided into a required data transmission rate for each available channel. Therefore, the first cognitive radio apparatus of the first cognitive radio small cell has requirement transmission rates of $r_1^{(1),t}, r_1^{(2),t}, r_1^{(3),t}$, and $r_1^{(4),t}$ for the respective available channels.

A second cognitive radio apparatus positioned in a second cognitive radio small cell may use the first to third channels, and has required data transmission rates of $r_2^{(1),t}, r_2^{(2),t}$, and $r_2^{(3),t}$ for the respective available channels.

Similarly, a k-th cognitive radio apparatus positioned in a k-th cognitive radio small cell has the first to fourth channels as the available channel and has divided required data transmission rates of $r_s^{(1),t}, r_k^{(2),t}, r_k^{(3),t}$, and $r_k^{(4),t}$ for the respective available channels.

In the case of the resource allocation in the related art, since a power control is performed for all channels based on a required transmission rate of the cognitive radio small cell, a calculation amount is proportional to an index of KS. When K cognitive radio apparatuses are present and S available channels are provided, the transmission power of the cognitive radio small cell is determined according to Equation 1.

$$\min_{p_k^{(s)}} \sum_{k=1}^{K} \sum_{s \in S_k} p_k^{(s)}$$

$$\text{s.t. } r_k \geq r_k^t$$

[Equation 1]

Equation 1 means a transmission power control that aims to satisfy the required transmission rate of the cognitive radio apparatus in the small cell and minimize power consumed in the small cell.

Meanwhile, in the resource allocation according to the exemplary embodiment of the present disclosure, the required transmission rate is divided into the required transmission rates for each available channel so as to satisfy the required transmission rate for each channel, and thereafter, the power control for each channel is independently performed. Accordingly, although described with reference to Equation 4 hereinafter, a calculation amount required for the resource allocation according to the embodiment of the present disclosure is proportional to an index of K and increases linearly to S. Depending on exemplary embodiments, as compared with the related art, complexity of the power control may decrease by 68% under an environment of K=2 and S=2, and the complexity of the power control may decrease by 99% under an environment of K=4 and S=4.

An interference environment for each channel is determined depending on the number of apparatuses which share the channel under an environment in which the channel is partially shared among cognitive radio small cells, and the respective channels have different environments. Therefore, in performing the multi band resource allocation by reflecting such an environment, first, a characteristic for each available channel is verified, and the required transmission rate is divided by reflecting the characteristic, so as to perform the resource allocation in parallel for each channel. Second, the resource allocation for each channel is performed by considering the required transmission rate for each channel.

Figure 5:
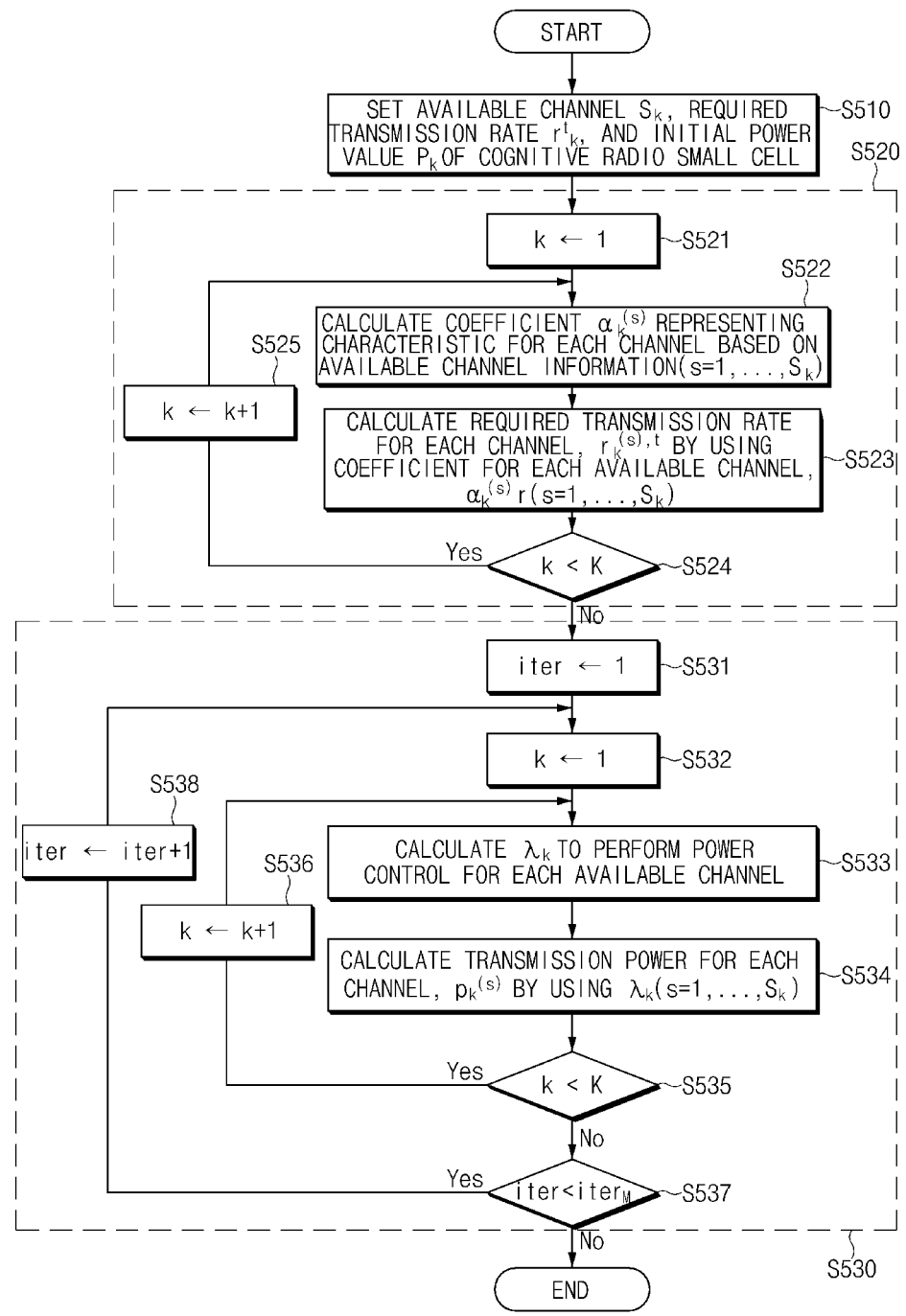
FIG. 5 is a flowchart for describing a method of allocating cognitive radio resources according to an exemplary embodiment of the present invention.

FIG. 5 is a flowchart for describing a method of allocating cognitive radio resources according to an embodiment of the present disclosure.

Referring to FIG. 5, the method of allocating radio resources according to the embodiment of the present disclosure includes setting a required transmission rate $r_k^t$ and an initial power value $P_k$ of an available channel $S_k$ of a cognitive radio small cell (step S510), dividing the required transmission rate of the cognitive radio small cell into required transmission rates for each available channel by analyzing a characteristic for each available channel according to available channel information (step S520), and performing a power control for each available channel based on the divided required transmission rates for each available channel (step S530).

The dividing of the required transmission rate of the cognitive radio small cell into the required transmission rates for each available channel by analyzing the characteristic for each available channel may be performed with respect to K cognitive radio apparatuses. Hereinafter, the corresponding step will be described in detail.

k is set to 1 in order to determine the required transmission rate for each available channel with respect to K cognitive radio apparatuses (step S521).

The cognitive radio small cell acquires available channel information of the small cell. For example, the available channel information may include a protection service type, a data transmission rate, the number of available channels, interference intensity, an SINR, an SLNR, and the number of sharing apparatuses of the available channel $S_k$. As illustrated in FIG. 2, the cognitive radio small cell may acquire the available channel information through a method of accessing database or sensing a spectrum.

The characteristic for each channel is analyzed based on the available channel information (step S522). One or more available channel information may be used at the time of analyzing the channel characteristic. Depending on exemplary embodiments, the characteristic for each channel may be analyzed by reflecting an SINR for each channel and the number of available channels or the channel characteristic may be analyzed by using at least two factors of factors included in the available channel information.

A characteristic coefficient representing the characteristic for each channel is defined as $$\left(\alpha_k^{(s)}, \sum_{s \in S_k} \alpha_k^{(s)} = 1\right),$$

represents a relative interference amount for each available channel, and is calculated as Equation 2.

$$\alpha_k^{(s)} = \frac{w_s r_k^{(s)}}{\sum_{s \in S_k} w_s r_k^{(s)}}, s \in S_k \quad \text{[Equation 2]}$$

In Equation 2, a characteristic coefficient $\alpha_k^{(s)}$ may be expressed by the sum of weight values of the transmission rate $r_k^{(s)}$, and $w_s$ may reflect the protection service type, the interference intensity, the number of sharing apparatuses, the number of available channels, and the like, as a weight value for each channel.

The required transmission rate for each channel is calculated based on the analyzed characteristic for each channel (step S523). Depending on exemplary embodiments, system quality of service (QoS) information may also be used together in determining the required transmission rate for each channel. For example, the system QoS information may include a required bit error rate (BER) and the required transmission rate.

When a required transmission rate of the cognitive radio small cell k is $r_k^t$, a required transmission rate of a channel S is represented by Equation 3.

$$r_k^{(s),t} = \alpha_k^{(s)} r_k^t, s \in S_k \quad \text{[Equation 3]}$$

As described above, a process of calculating the required transmission rate for each channel depending on the characteristic for each channel is repeated with respect to respective cognitive radio small cells, and when k is smaller than K (step S524, Yes), k is increased by 1 (step S525).

When all of the required transmission rates for each available channel are calculated with respect to K cognitive radio small cells (step S524, No), the power control for each channel is performed based on the calculated required transmission rates for each available channel.

Hereinafter, the step (step S530) of performing the power control for each available channel based on the divided required transmission rates for each available channel will be described in detail.

The power control for each channel may also be repeatedly performed with respect to K cognitive radio small cells. Further, an operation performed with respect to K cognitive radio small cells may be repeatedly calculated for the predetermined number of operation times. Therefore, steps described below are repeated by setting an indicator iter to 1 (step S531), and increasing the indicator iter by 1 (step S538) until the indicator iter is smaller than a maximum indicator $\text{iter}_M$ (step S537, Yes). When the indicator iter is equal to or greater than the maximum indicator $\text{iter}_M$ (step S537, No), an operation is terminated.

Hereinafter, an operation corresponding to one loop of the indicator iter will be described.

k is set to 1 for a transmission power control for the cognitive radio small cell k of the K cognitive radio small cells (step S532).

According to the required transmission rate for each available channel, $r_k^{(s),t}$, which is calculated in step S520, transmission power allocated for each available channel may be represented by Equation 4.

$$\min_{p_k^{(s)}} \sum_{k=1}^{K} p_k^{(s)} \quad \text{[Equation 4]}$$
$$\text{s.t.} \quad r_k^{(s)} \geq r_k^{(s),t}$$

Equation 4 represents a method of controlling transmission power that satisfies the required transmission rate for each available channel among the small cells that share the channel s, and minimizes the transmission power.

The transmission power, which is a solution of Equation 4, is calculated as below according to a Water-pouring algorithm in the related art.

$$p_k^{(s)} = \left\lfloor \frac{\lambda_k}{\ln 2} - \frac{1}{SINR_k^{(s)}} \right\rfloor_+, \lambda_k = \frac{2^{r_k^{(s),t}} \ln 2}{SINR_k^{(s)}}.$$

Accordingly, $\lambda_k$ is calculated based on the required transmission rate for each available channel, $r_k^{(s),t}$ (step S533). The transmission power for each channel, $p_k^{(s)}$ is calculated based on the calculated $\lambda_k$ (step S534).

When the transmission power is calculated with respect to the available channel $S_k$ of the cognitive radio small cell, the same process is repeated with respect to other cognitive radio small cells, and then all calculations are completed with respect to K cognitive radio small cells (step S535), the process proceeds to a next step.

As described above, operations as many as the maximum indicator iter$_M$ may be performed with respect to all cognitive radio small cells.

The method of allocating radio resources according to the embodiment of the present disclosure analyzes the characteristic according to the available channel information for the cognitive radio small cell, divides the required transmission rate for each available channel, and then controls the transmission power. As a result, an operation for controlling the transmission power may be simplified.

Figure 6:
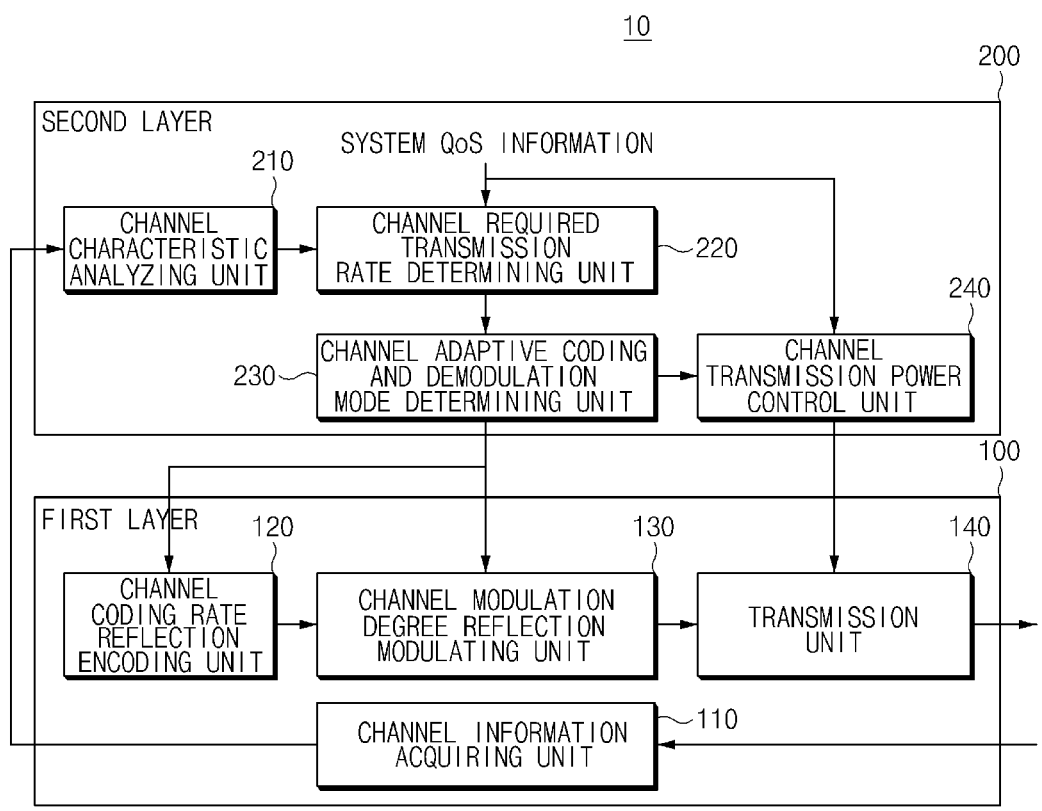
FIG. 6 is a block diagram illustrating an apparatus of allocating radio resources, which performs the method of allocating radio resources according to an exemplary embodiment of the present invention.

FIG. 6 is a block diagram illustrating an apparatus of allocating radio resources, which performs the method of allocating radio resources according to an embodiment of the present disclosure.

Referring to FIG. 6, an apparatus 10 of allocating radio resources operates interacting between two layers of a first layer 100 and a second layer 200. For example, the first layer may correspond to a physical layer, and the second layer may correspond to a medium access control layer.

A channel information acquiring unit 110 that operates in the first layer acquires information on channels usable in the cognitive radio small cell at present. The acquired channel information is provided to a channel characteristic analyzing unit 210, which operates in the second layer, to analyze the characteristic for each channel. As described above, the available channel information may include the protection service type, data transmission rate, the number of available channels, the interference intensity, the SINR, and the SLNR of the available channel. The channel characteristic analyzing unit 210 may calculate a characteristic coefficient $\alpha_k^{(s)}$ based on two or more factors in the available channel information.

A channel required transmission rate determining unit 220 that operates in the second layer may calculate the required transmission rate for each channel, $r_k^{(s),t}$ based on the characteristic coefficient and the system QoS information.

The calculated required transmission rate for each channel is provided to a channel transmission power control unit 240 together with an adaptive coding and modulation mode information determined by a channel adaptive coding and modulation mode determining unit 230.

The channel transmission power control unit 240 calculates the transmission power for each available channel, $p_k^{(s)}$ based on the required transmission rates divided for each channel and the system QoS information.

The calculated transmission power for each available channel is provided to a transmission unit 140 of the first layer.

A channel coding rate reflection encoding unit 120 and a channel modulation degree reflection modulating unit 130 perform encoding and modulation based on the channel adaptive symbol and modulation mode determined in the second layer. A signal generated through the encoding and modulation is finally transmitted by the transmission unit 140 based on the transmission power for each available channel.

As described above, the apparatus 10 of allocating radio resources according to the embodiment of the present disclosure analyzes the channel characteristic while transmitting and receiving data between the first layer and the second layer and determines the required transmission rate for each available channel, thereby reducing a load of the channel transmission power control unit 240.

As described above, the method of allocating radio resources and the apparatus of allocating radio resources according to the present disclosure are to allocate the multi-band resource under an interference environment partially sharing the available channel. As a result, the method and the apparatus may be more efficiently used in a space where cells are concentrated.

The method of allocating radio resources and the apparatus of allocating radio resources according to the present disclosure may improve efficiency of the power control by lowering operation complexity for the power control.

The aforementioned present disclosure is not limited to the aforementioned exemplary embodiments and the accompanying drawings, and it will be obvious to those skilled in the art to which the present disclosure pertains that various substitutions, modifications, and changes may be made within the scope without departing from the technical spirit of the present disclosure.

What is claimed is:

1. A method of allocating radio resources, the method comprising:
    acquiring available channel information of a cognitive radio small cell;
    analyzing a channel characteristic based on the available channel information and dividing a required transmission rate of the cognitive radio small cell into required transmission rates for each available channel; and
    performing a power control for each available channel based on the divided required transmission rates for each available channel; wherein
    the performing of the power control for each available channel includes determining transmission power for each available channel, the transmission power for each available channel, $pk\hat{\ }(s)$ for the available channel s of the cognitive radio small cell k is calculated by $\min_{(p\_k\hat{\ }((s)))} \Sigma_{(k=1)}\hat{\ } K p\_k\hat{\ }((s))$ s.t. $r\_k\hat{\ }((s)) \geq r\_k\hat{\ }((s),t)$, and $rk\hat{\ }(s)$ corresponds to a transmission rate of the available channel s of the cognitive radio small cell k, and $rk\hat{\ }(s)'$ t corresponds to the required transmission rate for each available channel of the available channel s of the cognitive radio small cell k.

2. The method of claim 1, wherein the dividing of the required transmission rate of the cognitive radio small cell into the required transmission rates for each available channel includes:
   calculating a characteristic coefficient based on the available channel information; and
   calculating the required transmission rates for each available channel based on the characteristic coefficient and the required transmission rate of the cognitive radio small cell.

3. The method of claim 2, wherein the available channel information includes at least one of a protection service type of an available channel, a data transmission rate, the number of available channels, interference intensity, a signal to interference plus noise ratio (SINR), and a signal to leakage plus noise ratio (SLNR).

4. The method of claim 2, wherein the characteristic coefficient $\alpha k\hat{\ }(s)$ for an available channel s of a cognitive radio small cell k is calculated by $\alpha\_k\hat{\ }((s)) = (w\_s\, r\_k\hat{\ }((s)))/(\Sigma\_(s \in S\_k) w\_s\, r\_k\hat{\ }((s)))$, $s \in S\_k$, and Ws corresponds to a weight value set and calculated based on the available channel information.

5. The method of claim 1, wherein the calculating of the required transmission rate for each available channel and the performing of the power control are implemented in a cross-layer.

6. The method of claim 1, wherein the method is performed under an interference environment in which a plurality of cognitive radio small cells is present and the plurality of cognitive radio small cells share the available channel.

7. An apparatus of allocating radio resources under an interference environment in which a plurality of cognitive radio small cells partially shares an available channel, the apparatus comprising:
   a channel information acquiring unit configured to acquire available channel information of a cognitive radio small cell;
   a channel characteristic analyzing unit configured to analyze a channel characteristic based on the available channel information;
   a channel required transmission rate determining unit configured to divide a required transmission rate of a cognitive radio small cell into required transmission rates for each available channel based on the analyzed channel characteristic; and
   a channel transmission power control unit configured to perform a power control for each available channel based on the divided required transmission rates for each available channel; wherein
   the channel transmission power control unit allocates transmission power of pk(s) calculated as below with respect to an available channel s of a cognitive radio small cell k $\min_{(p\_k\hat{\ }((s)))} \Sigma\_(k=1)\hat{\ } K p\_k\hat{\ }((s))$
   s.t. $r\_k\hat{\ }((s)) \geq r\_k\hat{\ }((s),t)$, and $rk\hat{\ }(s)$, corresponds to a transmission rate of the available channel s of the cognitive radio small cell k, and $rk\hat{\ }(s)'$ t corresponds to the required transmission rate for each available channel of the available channel s of the cognitive radio small cell k.

8. The apparatus of claim 7, wherein the channel information acquiring unit operates in a first layer, and
   the channel characteristic analyzing unit operates in a second layer distinguished from the first layer.

9. The apparatus of claim 8, further comprising:
   a transmission unit configured to transmit a signal having transmission power corresponding to the controlled power and operate in the first layer.

10. The apparatus of claim 7, wherein the available channel information includes a protection service type of an available channel, a data transmission rate, the number of available channels, interference intensity, a signal to interference plus noise ratio (SINR), and a signal to leakage plus noise ratio (SLNR).

11. The apparatus of claim 10, wherein the channel characteristic analyzing unit analyzes the channel characteristic by using two or more of the available channel information.

12. The apparatus of claim 7, wherein the channel transmission power control unit determines transmission power for each available channel based on the required transmission rate for each available channel, an adaptive coding and demodulation mode for each channel, and system quality of service (QoS).

13. The apparatus of claim 7, wherein the channel characteristic analyzing unit calculates a characteristic coefficient based on the available channel information, and multiplies the calculated characteristic coefficient by the required transmission rate of the cognitive radio small cell to calculate the required transmission rate for each available channel.

14. The apparatus of claim 13, wherein the characteristic coefficient $\alpha k\hat{\ }(s)$ for the available channel s of the cognitive radio small cell k is calculated by $\alpha\_k\hat{\ }((s)) = (w\_s\, r\_k\hat{\ }((s)))/\Sigma\_(s \in S\_k) w\_s\, r\_k\hat{\ }((s)))$, $s \in S\_k$, and Ws corresponds to a weight value set and calculated based on the available channel information.

* * * * *